(12) United States Patent
Guerrini

(10) Patent No.: US 9,890,066 B2
(45) Date of Patent: Feb. 13, 2018

(54) COMPOSITION AND SYSTEM FOR TREATING PAINT SPRAY BOOTH WATER

(75) Inventor: Robert J. Guerrini, Mechanicsville, VA (US)

(73) Assignee: CHEMTREAT, INC., Glen Allen, VA (US)

(*) Notice: Subject to any disclaimer, the term of this patent is extended or adjusted under 35 U.S.C. 154(b) by 681 days.

(21) Appl. No.: 13/269,555

(22) Filed: Oct. 7, 2011

(65) Prior Publication Data

US 2013/0015139 A1    Jan. 17, 2013

Related U.S. Application Data

(60) Provisional application No. 61/391,064, filed on Oct. 7, 2010.

(51) Int. Cl.
| | | |
|---|---|---|
| *C02F 1/00* | (2006.01) | |
| *C02F 1/52* | (2006.01) | |
| *C08K 3/16* | (2006.01) | |
| *C08K 3/10* | (2018.01) | |
| *C02F 103/14* | (2006.01) | |

(52) U.S. Cl.
CPC .......... *C02F 1/5236* (2013.01); *C02F 1/5272* (2013.01); *C08K 3/10* (2013.01); *C08K 3/16* (2013.01); *C02F 2103/14* (2013.01)

(58) Field of Classification Search
CPC ... C09D 7/008; C09D 7/04; C02F 5/10; C02F 1/54; B05B 15/1229; D21H 17/28; D21H 17/67
USPC ....... 210/696–701, 917, 702, 723, 724, 734, 210/728, 930; 252/60, 175–181; 162/175, 177, 181.1, 181.2, 181.3, 181.4, 162/181.5; 118/603, 610
See application file for complete search history.

(56) References Cited

U.S. PATENT DOCUMENTS

| | | | | |
|---|---|---|---|---|
| 4,440,647 | A | * | 4/1984 | Puchalski ...................... 210/728 |
| 5,167,830 | A | * | 12/1992 | Ficker ........................... 210/712 |
| 5,556,510 | A | * | 9/1996 | Dreisbach et al. ........... 162/158 |
| 6,485,656 | B1 | * | 11/2002 | Meyer et al. .................. 252/364 |
| 2009/0048126 | A1 | * | 2/2009 | Phatak et al. ................. 507/209 |
| 2010/0326923 | A1 | * | 12/2010 | Miknevich et al. .......... 210/734 |

* cited by examiner

*Primary Examiner* — Claire A Norris
(74) *Attorney, Agent, or Firm* — Oliff PLC

(57) ABSTRACT

Disclosed are combinations of one or more cationic starch(es) and aluminum salts to produce a composition for detackifying paint at lower doses than those required using conventional treatments while providing improved handling and a more "green" environmental profile. The compositions may be utilized in methods of detackifying and dispersing solvent borne paints and/or coagulating/flocculating and dispersing waterborne paints during the treatment of paint spray booth water.

2 Claims, No Drawings

COMPOSITION AND SYSTEM FOR TREATING PAINT SPRAY BOOTH WATER

PRIORITY STATEMENT

This application claims priority under 35 U.S.C. § 119(e) from U.S. Prov. Pat. Appl. No. 61/391,064, the contents of which are hereby incorporated, in their entirety, by reference.

BACKGROUND OF THE INVENTION

The invention is directed to a previously unknown combination of one or more cationic starch(es) and aluminum salts to produce a composition which can detackify paint at lower doses than those required using conventional treatments while providing improved handling and a more "green" environmental profile.

Methods and compositions for detackifying and dispersing, and coagulating/flocculating and dispersing solvent borne and waterborne paints, respectively, in paint spray booth waters are disclosed. An aqueous composition of water soluble cationic starch polymer, is used in conjunction with an aluminum compound to treat the paint spray booth waters.

In the automotive and related coatings industries, it is estimated that between 20 to 40% of the total volume of paint sprayed is overspray. In the application of organic paints such as epoxy resins, high solids enamel paints and the like, it is necessary to trap the oversprayed paint. In large industrial applications such as auto body coating, this is accomplished by the use of water curtains on the interior booth walls, whereby the oversprayed coating material is incorporated into the water as it cascades down the walls of the booth into a reservoir.

Typically, this water is recirculated back to the booth by means of recirculating pumps. The agglomeration and accumulation of live coating material in the water of the paint spray booth results in serious problems such as blockage of the pipes and circulating pumps as well as an accumulation of paint on the walls of the paint spray booth behind the water curtain. As more and more coating material is sprayed in the booth, the overspray material removed from the air builds up in the water in the form of tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the water reservoir also creates serious maintenance problems when the system is periodically cleaned out, requiring much effort to remove the heavy build-up of coating material from the reservoir.

It is desirable, to treat the water in the paint booth in such a way as to render the over-sprayed coating material free of stickiness and tackiness so that it readily separates from the water, does not adhere to the spray booth walls, pipes, pumps; or other surfaces and internal components of the spray booth system, and maintains a floating, detackified condition.

FIELD OF THE INVENTION

The detackification of sticky materials in aqueous systems is a common problem in many industrial operations, particularly those involving the painting or coating of surfaces using a liquid coating composition. Paint overspray can be removed from the paint spray booth ("PSB") by an exhaust flow which is then typically scrubbed by recirculating water to remove the majority of the particles. The oversprayed paint particles from the exhaust flow that are removed in the scrubber and become entrained in the spray booth water, if untreated, may cause plugging of piping and spray nozzles thus reducing the operating efficiency of the spray booth and, in the case of solvent based paint compositions, increasing the volatile organic compound ("VOC") emissions from the coating operation.

During the spray application of paints, coatings and/or adhesives including, for example, polyurethanes, epoxy resins, lacquers, enamels, as well as waterborne paints, it is normally necessary to trap and remove the oversprayed coating materials in some way to avoid a buildup of such particles on the walls of the spray booth as well as the surfaces of the exhaust system, scrubber and recirculating water system.

In many large industrial installations including, for example, auto body painting systems, oversprayed coating materials are collected by water "curtains" which cascade down the interior spray booth walls. The agglomeration and accumulation in the water supply of these systems of this live coating material collected by these curtain flows can result in serious problems including, for example, blockages or flow restrictions in the pipes and pumps which circulate the water, and a build-up of paint on the walls of the booth beyond the water curtain.

As more and more coating material is sprayed in the booth, the material removed from the air builds up in the water in the form of a tar-like coherent sludge which in a short time can foul the pumps and lines of the paint spray booth recirculating water system. Furthermore, this sludge is extremely difficult to remove from the pump, lines, reservoir, and other internal surfaces of the system with which it comes in contact. The accumulation of coating materials in the bottom of the water reservoir also creates a serious problem when the system is periodically cleaned out, with much effort being required to remove the heavy build-up of coating material on the bottom of the reservoir.

Many present paint spray booth detackification treatments are based upon clays (e.g., hectorite or bentonite), amphoteric metals (e.g., sodium zincate) and polymers (e.g., diallyldimethyl ammonium chloride and melamine aldehydes) or a combination of these. Detackification typically involves the adsorption of the material added onto a paint particle (as disclosed in this invention) similar to a coagulant. However, not all detackifiers are recognized as coagulants. For example, inorganic clays are detackifiers but they do not perform as coagulants. This is because they do not have overall cationic charge and therefore do not agglomerate particles, which generally have a negative charge.

In addition, not all coagulants are effective detackifiers, since a detackifier after adsorption to the paint particle must render the paint non-sticky. Addition of inorganic coagulants such as alum (hydrated potassium aluminum sulfate) or organic polymeric coagulants, such as DMA-EPIs (epichlorohydrin dimethylamines), do not produce a non-tacky paint when adsorbed on the paint particle.

DESCRIPTION OF RELATED ART

One approach to detackification has been to combine certain polymeric materials with amphoteric metals. Thus, for example, U.S. Pat. No. 3,861,887, the contents of which are incorporated, in their entirety, by reference, discloses treatment of paint booth wash water with a blend of poly-cationic water dispersible polymer with a water-soluble salt of an amphoteric metal to reduce the tackiness of paint. One problem with this approach is that use of metals, such as zinc, can create additional disposal concerns for the wastewater and sludge recovered from it.

Another approach has been to use a clay-based treatment. For example, U.S. Pat. No. 4,504,395, the contents of which are incorporated, in their entirety, by reference, discloses that certain hectorite clays can be effectively used to detackify oversprayed paint. A problem with this approach is that the sludge produced using clays can be difficult to dewater, resulting in larger volumes of potentially hazardous materials requiring haul-out to a secure landfill.

Yet another approach is to use a melamine-aldehyde acid colloid solution as disclosed in U.S. Pat. No. 4,656,059. The melamine-aldehyde acid colloid solution is produced by causing melamine to react with aldehyde, preferably formaldehyde or paraformaldehyde, to form a melamine-formaldehyde reaction product and then adding acid to the melamine-formaldehyde reaction product to form the melamine-aldehyde acid colloid solution. The use of this composition entails the following disadvantages: (a) the paint is not completely detackified, (b) the melamine-aldehyde acid colloid product typically contains greater than 0.1% free formaldehyde which is a suspect carcinogen, and (c) as a consequence of incomplete detackification the paint cannot be effectively dewatered and thus results in increased hazardous waste sludge production.

U.S. Pat. No. 4,440,647, Puchalski, discloses a paint spray booth composition consisting of a polyamide-epichlorohydrin resin, a polymer formed from reacting hexamethylene diamine and ethylene chloride. An amphoteric metal salt is also added.

U.S. Pat. No. 4,637,824, Pominville, teaches a method for detackifying airborne paint particles captured in an aqueous wash stream by adjusting the pH to 7 to 12 with an alkali metal silicate and then contacting the paint wastes in the wash water with an amphoteric metal salt such as aluminum chloride and a poly(diallyldimethyl ammonium halide) polymer.

U.S. Pat. No. 4,948,513, Mitchell, teaches methods for detackifying spray booth water containing paint particles by adding a combination of hydrophilic/lipophilic quaternary ammonium repeat unit polymers or diallyldialkyl quaternary ammonium compounds and the reaction product of tannin, an amino compound and an aldehyde.

U.S. Pat. No. 5,073,205, Morse, teaches the use of copolymers of N-methylolacrylamide and methyldiallylamine as detackifiers of solventborne paints in the circulating water of water wash paint spray booths.

Hunter et al., U.S. Pat. No. 5,076,939, teaches a method similar to Rey but substitutes an alumina coated silica sol for the aluminum salt in the process.

U.S. Pat. Nos. 5,147,557 and 5,147,558, Purnell, teach processes for detackifying and coagulating oversprayed waterborne and mixed waterborne and oil based paint particles in the water collection system of a paint spray booth. The processes comprise adding a blend of an inorganic anion and a cationic polymer selected from the group consisting of polydiallyldimethyl ammonium chloride, a condensation product of dimethylamine plus epichlorohydrin and a condensation product of dimethylamine plus ethylenediamine and epichlorohydrin.

U.S. Pat. No. 5,215,668, to Bhattacharyya, et al., the contents of which are incorporated, in their entirety, by reference, discloses a method in which paint overspray from a paint spray operation is detackified by treating the waste water system of such an operation with a composition comprising an amphoteric polymer and aluminum salts. As disclosed, the amphoteric polymer contains at least about 10 mole percent of cationic mer units of monoethylenically unsaturated monomer and at least 1 mole percent of anionic mer units. The aluminum salt preferred is aluminum sulfate, or its hydrates, for example alum. The amphoteric polymers preferably contain DMAEM, DMAEM.H$_2$SO$_4$, DMAEM.MCQ, or mixtures thereof, with acrylic acid, methacrylic acid, AMPS, or mixtures thereof. The amphoteric polymers may also contain neutral monomers such as (meth)acrylamide.

U.S. Pat. No. 5,250,189, Rey, teaches methods of treating paint spray booth water by maintaining the pH and alkalinity of the PSB water and adding an aluminum salt and a flocculant to the water before contacting the oversprayed, waterborne paint. The aluminum salt can be aluminum chlorohydrate and the flocculant can be a cationic polyelectrolyte or quaternary ammonium polymer.

U.S. Pat. No. 5,719,224, the contents of which are incorporated, in their entirety, by reference, discloses a method and composition for detackifying or coagulating and flocculating waterborne and mixed waterborne/solventborne paints in paint spray booth water. Aluminum chlorohydrate and a tannin containing polymer, preferably in an aqueous solution, are added to the paint spray booth water to detackify or coagulate and flocculate the paints.

U.S. Pat. No. 6,858,093, the contents of which are incorporated, in their entirety, by reference, discloses a composition and method for treating oversprayed paints in paint spray booths. The composition includes an aqueous solution of a compound such as chitosan, and a complex metal salt, such as aluminum chlorohydrate, capable of flocculating the oversprayed paint, and optionally, bentonite clay. The composition is described as being suitable for detackifying and flocculating oversprayed paint, and particularly suitable been used as a liquid concentrate for the addition to wash systems in paint spray booths for water-based and solvent-based paints. The composition is also useful in decreasing the time for phase separation of the organic phase and the aqueous phase in solvent-based removal processes.

U.S. Pat. No. 7,179,385, the contents of which are incorporated, in their entirety, by reference, discloses a composition and method for treating paint booth water systems to facilitate paint removal. The composition comprises water, solid particles of insoluble organic polymer, such as, by way of non-limiting example, urea methanal (also known as urea-formaldehyde) copolymer, preferably including less than 50 weight percent of particles of diameter of 1 micron or less, and optionally surfactants, thickeners, polymeric flocculants different from the organic polymer, clarifiers, anti-corrosive components, and/or biocides.

EP 0 525 989A2, Huang et al., teaches a method for detackification of oversprayed paint in wastewater by adding an amphoteric polymer and an aluminum salt. The amphoteric polymer contains both anionic and cationic mer units and preferably in the presence of (meth)acrylamide mer units.

If not already specifically incorporated by reference, each of the prior art references noted above is hereby incorporated by reference, in its entirety and for all purposes.

BRIEF SUMMARY OF THE INVENTION

The invention is directed to a previously unknown combination of one or more cationic starch(es) and aluminum salts to produce a composition which can detackify paint at lower doses than those required using conventional treatments while providing improved handling and a more "green" environmental profile.

Methods and compositions for detackifying and dispersing, and coagulating/flocculating and dispersing solvent borne and waterborne paints, respectively, in paint spray booth waters are disclosed. An aqueous composition of water soluble cationic starch polymer, is used in conjunction with an aluminum compound to treat the paint spray booth waters.

In the automotive and related coatings industries, it is estimated that between 20 to 40% of the total volume of paint sprayed is overspray. In the application of organic paints such as epoxy resins, high solids enamel paints and the like, it is necessary to trap the oversprayed paint. In large industrial applications such as auto body coating, this is accomplished by the use of water curtains on the interior booth walls, whereby the oversprayed coating material is incorporated into the water as it cascades down the walls of the booth into a reservoir.

Typically, this water is recirculated back to the booth by means of recirculating pumps. The agglomeration and accumulation of live coating material in the water of the paint spray booth results in serious problems such as blockage of the pipes and circulating pumps as well as an accumulation of paint on the walls of the paint spray booth behind the water curtain. As more and more coating material is sprayed in the booth, the overspray material removed from the air builds up in the water in the form of tar-like coherent sludge which in a short time can foul the pumps and lines which circulate the booth's water. Furthermore, this sludge is extremely difficult to remove from the pump, lines, reservoir, and other internal surfaces of the system with which it comes in contact. The accumulation of raw paint masses in the water reservoir also creates serious maintenance problems when the system is periodically cleaned out, requiring much effort to remove the heavy build-up of coating material from the reservoir.

It is desirable, therefore, to treat the water in the paint spray booth in such a way as to render the over-sprayed coating material free of stickiness and tackiness so that it readily separates from the water, does not adhere to the spray booth walls, pipes, pumps; or other surfaces and internal components of the spray booth system, and maintains a detackified condition as it flows through the aqueous system.

DETAILED DESCRIPTION

The current invention is a composition and method to treat solids in a water system. Specifically, the water system could be a paint booth recirculation system, where paint solids are treated and separated from the booth water. The composition consists of a metal salt and cationic starch.

The purpose of this invention is to develop a more environmentally friendly paint treatment product to detackify and coagulate water-borne and solvent-borne paints. Over the years, products that have been used to detackify and coagulate paints included caustic, metal salts, silicates, quaternary ammonium salts, starch, tannin, melamine formaldehyde and combinations of the above. Over the last 20-25 years, the melamine chemistry has been proven the preferred chemistry in performance and overall operating cost, however, the stigma of the formaldehyde in the product provided a negative connotation. A few years ago, a more environmentally friendly or "greener" technology has been developed utilizing metal salts and a chitin based polymer.

The present disclosure is directed to a composition comprising both a cationic starch and a metal salt that satisfactorily detackifies a wide range of solvent-borne paints and coagulates water-borne and solvent-borne paints. The composition includes (a) a 1-50% solution of cationic starch and (b) a 50-99% solution of at least one metal salt, preferably aluminum chlorohydrate and/or ferric chloride. Other metal salts including, for example, alum, aluminum chloride, polyaluminum chloride and ferric sulfate could also be used. These materials would provide 0.3-18% of cationic starch solids and 25-40% metal salt solids. The preferred composition contains 15-50% of the cationic starch component and 50-85% of the metal salt component.

A range of starches that would be suitable for inclusion in this composition may be found in U.S. Pub. Pat. Appl. No. 2010/0326923, the contents of which are hereby incorporated, in their entirety, by reference. The preparation of cationic starch quarternary ammonium ethers is well known in the art. They may be synthesized by reacting starch and, e.g., a quarternary halohydrin salt with an alkali. The procedure used to synthesize a quarternary starch combination is disclosed in *Starch: Chemistry and Technology*, Whistler, R. L. and Paschall, E. F. eds., Chapter 16, Production and Uses of Cationic Starches, by Paschall E. F. (1967). This prior art reference is hereby incorporated by reference, in its entirety and for all purposes.

Applicable starches disclosed therein include corn, potato, bean, tapioca, sago, rice, wheat, waxy maize, grain sorghum, grain starches in raw or modified forms, e.g., modified with acid, oxidizing agent and the like; to amylose and amylopectin; and to the linear and branched components respectively, of corn starch; and also to dextrin.

The quarternary ammonium starches consist of a starch group and a quarternary ammonium group. The degree of substitution of these products is within the range of about 0.01 to 1.00 quarternary units per anhydroglucose unit in the starch group, more preferably, 0.1 to 0.75. A range of such starches is available commercially from Dober (previously Dober Chemical) of 11230 Katherine's Crossing, Suite 100, Woodridge, Ill.

The composition of the present invention is typically prepared by first adding acid to the starch polymer solution to reduce the pH to 2-5 and achieve an intermediate solution comprising 1-35% solids. Once this is accomplished, the metal salt(s) is/are blended into the starch polymer solution with the pH of the resulting treatment solution being adjusted to provide for an acidic solution, preferably having a pH of 4-6. The specific target pH range for the treatment solution is determined, at least in part, by the solubility of the particular metal salt(s) used in combination with the starch polymer(s).

The composition of the present invention is intended to be added to the paint spray booth water system, specifically, to be added to the recirculating water entering the paint spray booth area. When used in this manner, the composition dosage is dependent on, for example, the amount of paint entering the water and the composition of the paint. Typically, for every gallon of solvent-borne paint in the water, 0.1-0.2 gallons of the disclosed detackification composition would be added. Furthermore, for each gallon of water-borne paint in the water, 0.01-0.02 gallons of disclosed detackification composition is added. Although the necessary dosing requirements can be determined through limited experimentation, the disclosed dosage ranges should generally be sufficient to achieve acceptable detackification and coagulation of solvent-borne paints and/or acceptable coagulation of water-borne paints.

The paint booth water system is maintained at a pH of 7.5-9.5. The total alkalinity is operated between 250-800 ppm. An operating target is determined by the type of paint sprayed. The elevated pH and alkalinity in the booth water, disperses the paint droplet. Paint dispersion provides more paint droplet surface area, which is needed for the present invention to coat and detackify. The pH and alkalinity can then be adjusted by using, for example, dense soda ash, sodium metasilicate and/or caustic soda.

The recirculating water utilized in scrubbing water-borne paint particles has a preferred alkalinity operating range is 250-500 ppm with a preferred pH range of 7.5-8.5. The lower alkalinity is considered suitable because water-borne paints are not typically hydrophobic and can achieve sufficient dispersion without help from additional water chemistry tweaks apart from the pH and alkalinity to achieve sufficient coagulation of the paint from the recirculating In contrast to the water-borne paint particles, the recirculating water utilized in scrubbing solvent-borne paint particles has a preferred alkalinity operating range of 400-1000 ppm with a preferred pH range of 8.2-9.5. Solvent-borne paints tend to be more "sticky" and hydrophobic than water-borne paints. Accordingly, increases in both the alkalinity and pH relative to the water-borne paint particles are useful for improving the dispersal of the paint droplets. As will be appreciated by those skilled in the art, however, attention must be directed to controlling the conditions of and additives in the recirculating water to avoid excessive dispersal that will tend to suppress the desired coagulation and increase the likelihood of undesirable foaming within the aqueous system will occur.

As will be appreciated by those skilled in the art, during paint spray booth operation objects are sprayed with paint. Some, and typically most, of the paint or other coating emitting from the paint spray nozzles or other application devices, will be reach and attach to a surface of the target object with an overspray portion of the paint or other coating remains in the paint spray booth air. The paint spray booth air, laden with paint overspray particles, can be exhausted from the spray paint chamber through a water scrubber. As the contaminated air passes through the scrubber, a portion of the overspayed paint particles is transferred into the recirculation water, where the paint particles come into contact with the disclosed composition and is, consequently, detackified and induced to coagulate with other similarly converted paint particles.

The detackifier composition need only be added to the paint spray booth water during the paint operation and at a feed rate sufficient to maintain a treatment effective concentration within the recirculating water in the paint spray booth. The treatment composition feed can be accomplished by, for example, activating the treatment feed pumps in concert with the paint spray flow switches. The paint spray booth operation can be controlled and/or monitored to determine the application rate of primer, basecoat, clearcoat or other coating composition is being applied in each paint spray unit and how much of that material is expected to end up as overspray and be captured within the aqueous system. This data can then be used for adjusting the dosage of the treatment composition as a ratio of the coating materials being captured. Alternatively, if more precise application data is not available, a target feed rate can be used to ensure that sufficient quantities of the treatment composition are available within the recirculating system to address a "worst case" paint particle capture. Depending on the materials utilized and the control system(s) available, a wide range of dosages can be utilized with acceptable results. For example: an example dosage ratio could be 20:1 whereby for every 20 gallons of paint over spray captured within the recirculating water, 1 gallon of the treatment composition would be introduced to detackify solvent-borne paint. Depending on the particular operating characteristics, other dosage ratios of 15:1 or 25:1 ratio could be utilized as well.

The detackified paint particles will separate from the paint booth system water by coagulating with other paint particles and then sinking or floating, depending on the amount of air entrained in the water through the scrubbing process or other processes and accumulate within specific regions of the system configured for removing the separated and collected paint particles.

The utilizing the disclosed compositions in the operation of a paint spray booth can provide a number of advantages relative to conventional detackification compositions and methods including, for example:

1) reducing the dosage necessary to achieve acceptable paint detackification when compared with the dosage required using a conventional melamine chemistry;
2) reducing the associated waste solids;
3) reducing the dissolved solids in the recirculating paint spray booth water;
4) reduces cost of treating/maintaining a paint spray booth system;
5) reducing the moisture retention within the captured paint sludge cake dryness; and
6) improving paint solids separation from the paint spray booth water.

While the present invention has been described with references to preferred embodiments, various changes or substitutions may be made on these embodiments by those ordinarily skilled in the art without departing from the scope of the present invention. Therefore, the scope of the present invention encompasses not only those embodiments described above, but all those that fall within the scope of the claims provided below.

I claim:

1. A detackifying composition consisting essentially of:
an acidic aqueous solution of a cationic starch; and
a water soluble, inorganic metal salt selected from the group consisting of iron halogen salts, alum, aluminum chloride, and ferric sulfate.

2. The detackifying composition according to claim 1, wherein:
the composition comprises a solution in which the metal salt comprises from 50% to 85% of the dry weight and the cationic starch comprises from 15% to 50% of the dry weight.

* * * * *